(12) United States Patent
Mehta et al.

(10) Patent No.: US 9,355,438 B2
(45) Date of Patent: May 31, 2016

(54) SYSTEMS AND METHODS FOR CORRECTING GEOMETRIC DISTORTIONS IN VIDEOS AND IMAGES

(71) Applicant: Infosys Limited, Bangalore, Karnataka (IN)

(72) Inventors: Sachin Mehta, Himachal Pradesh (IN); Rajarathnam Nallusamy, Tamil Nadu (IN)

(73) Assignee: INFOSYS LIMITED, Bangalore, Karnataka (IN)

( * ) Notice: Subject to any disclaimer, the term of this patent is extended or adjusted under 35 U.S.C. 154(b) by 0 days.

(21) Appl. No.: 14/596,986

(22) Filed: Jan. 14, 2015

(65) Prior Publication Data

US 2015/0199798 A1    Jul. 16, 2015

(30) Foreign Application Priority Data

Jan. 15, 2014   (IN) .............. 165/CHE/2014

(51) Int. Cl.
*G06K 9/40* (2006.01)
*G06T 5/00* (2006.01)
*G06T 1/00* (2006.01)
*G06T 3/00* (2006.01)
*G06T 5/50* (2006.01)

(52) U.S. Cl.
CPC .............. *G06T 5/006* (2013.01); *G06T 1/0064* (2013.01); *G06T 3/0006* (2013.01); *G06T 5/50* (2013.01); *G06T 2207/10016* (2013.01)

(58) Field of Classification Search
USPC .......... 382/275, 241, 254, 284, 294; 345/475, 345/700, 723; 348/36, 241; 455/450; 715/720, 721, 722
See application file for complete search history.

(56) References Cited

U.S. PATENT DOCUMENTS

| | | | |
|---|---|---|---|
| 5,970,173 A | 10/1999 | Lee et al. | |
| 6,563,937 B1 | 5/2003 | Wendt | |
| 6,636,220 B1 * | 10/2003 | Szeliski | .................. G06T 13/80 345/475 |
| 6,985,601 B2 | 1/2006 | Wendt | |

FOREIGN PATENT DOCUMENTS

WO          02/13138 A1    2/2002

* cited by examiner

*Primary Examiner* — Anh Do
(74) *Attorney, Agent, or Firm* — Michael Best & Friedrich LLP (57) ABSTRACT

The geometric distortions of videos and images are corrected wherein a plurality of geometrically distorted frames are mapped with a plurality of original frames of the video content. Further, one or more features associated with the mapped frames are identified as insensitive to the one or more geometric distortions. One or more features of the mapped frames are further mapped with original frames based on a predefined similarity threshold and thereafter one or more geometric distortion parameters are determined. Furthermore, a frame level average distortion and a video level average distortion of each of the one or more geometric distortion parameters are determined, based on which the one or more geometric distortions of the video content are corrected.

18 Claims, 9 Drawing Sheets

SYSTEMS AND METHODS FOR CORRECTING GEOMETRIC DISTORTIONS IN VIDEOS AND IMAGES

BACKGROUND OF THE INVENTION

The invention relates generally to correct one or more geometric distortions, and in particular, to a system and method for correcting geometric distortions in video or image contents.

The advancement in multimedia and networking technologies along with the availability of multitude of end user devices have enabled easy creation, sharing and distribution of multimedia content over the Internet at any time and from anywhere in the world. However, these advancements have raised security concerns. To tackle such challenges, digital watermarking has emerged as a promising solution. Digital watermarking techniques aim at embedding a message inside the digital content (images or videos) which can be extracted later on from the suspected files for proving the digital rights. However, the advancement in multimedia technologies have facilitated easy manipulation of the digital videos. Such manipulations can be intentional or unintentional and can obscure in watermark detection. These manipulations can be classified as simple image processing attacks such as compression or geometric attacks such as scaling. A number of image as well as video watermarking methods are available in literature which are robust against simple image processing attacks. However, majority of the techniques are vulnerable to geometric distortions. Geometric distortions in watermarked content lead to synchronization issues and ultimately result in loss of watermark.

Present techniques to correct geometric distortions are non-blind in nature and application of such geometric correction methods is limited to digital images only. Additionally, these techniques are not applicable for videos due to its temporal nature and presence of different special effects such as fading and dissolve.

SUMMARY OF THE INVENTION

The present technique overcomes the above mentioned limitation by identifying the geometric distortion parameters and then correcting these identified geometric distortions. This technique is robust against any kind of geometric distortion in images as well as videos.

According to the present embodiment, a method for correcting one or more geometric distortions in a video content and in an image is disclosed. In case of correcting the one or more geometric distortions in the video content, the method includes mapping a plurality of geometrically distorted frames with a plurality of original frames of the video content. After that, one or more features associated with the plurality of mapped geometrically distorted frames and original frames are identified, wherein the one or more features are insensitive to the one or more geometric distortions. Thereafter, the one or more features of the plurality of mapped geometrically distorted frames with original frames are mapped based on a predefined similarity threshold. Further, one or more geometric distortion parameters are determined from the one or more mapped features. Then, a frame level average distortion of each of the one or more geometric distortion parameters is determined. After that, a video level average distortion of each of the one or more geometric distortion parameters is determined based on the frame level average distortion. Finally, the one or more geometric distortions of the video content are corrected based on the video level average distortion of each of the one or more geometric distortion parameters. In case of correcting the one or more geometric distortions in the image, the method includes identifying one or more features associated with an original image and a geometrically distorted image, wherein the one or more features are insensitive to the one or more geometric distortions. Thereafter, the one or more features of the original image and geometrically distorted image are mapped based on a predefined similarity threshold. After that, one or more geometric distortion parameters are determined from the one or more mapped features. Then, an average distortion value of the one or more mapped features is determined with respect to the one or more geometric distortion parameters. Finally, the one or more geometric distortions are corrected based on the average distortion value of the one or more mapped features.

In an additional embodiment, a system for correcting one or more geometric distortions in a video content and in an image is disclosed. In case of correcting the one or more geometric distortions in the video content, the system includes a frame mapping component, a feature identifier, a feature mapping component, a geometric distortion parameter determination component, a frame level average distortion determination component, a video level average distortion determination component and a geometric distortion corrector. The frame mapping component is configured to map a plurality of geometrically distorted frames with a plurality of original frames of the video content. The feature identifier is configured to identify one or more features associated with the plurality of mapped geometrically distorted frames and original frames, wherein the one or more features are insensitive to the one or more geometric distortions. The feature mapping component is configured to map the one or more features of the plurality of mapped geometrically distorted frames with original frames based on a predefined similarity threshold. The geometric distortion parameter determination component is configured to determine one or more geometric distortion parameters from the one or more mapped features. The frame level average distortion determination component is configured to determine a frame level average distortion of each of the one or more geometric distortion parameters. The video level average distortion determination component is configured to determine a video level average distortion of each of the one or more geometric distortion parameters based on the frame level average distortion. The geometric distortion corrector is configured to correct the one or more geometric distortions of the video content based on the video level average distortion of each of the one or more geometric distortion parameters. In case of correcting the one or more geometric distortions in the image, the system includes a feature identifier, a feature mapping component, a geometric distortion parameter determination component, an average distortion value determination component and a geometric distortion corrector. The feature identifier is configured to identify one or more features inside an original image and a geometrically distorted image, wherein the one or more features are insensitive to the one or more geometric distortions. The feature mapping component is configured to map the one or more features of the original image with the geometrically distorted image based on a predefined similarity threshold. The geometric distortion parameter determination component is configured to determine one or more geometric distortion parameters from the one or more mapped features. The average distortion value determination component is configured to determine an average distortion value of the one or more mapped features with respect to the one or more geometric distortion parameters. The geometric distortion corrector is configured to correct the one or more geometric distortions based on the average distortion value of the one or more mapped features.

In another embodiment, a computer readable storage medium for correcting one or more geometric distortions in a video content and in an image is disclosed. In case of correcting the one or more geometric distortions in the video content, the computer readable storage medium which is not a signal stores computer executable instructions for mapping a plurality of geometrically distorted frames with a plurality of original frames of the video content, identifying one or more features associated with the plurality of mapped geometrically distorted frames and original frames, mapping the one or more features of the plurality of mapped geometrically distorted frames with original frames based on a predefined similarity threshold, determining one or more geometric distortion parameters from the one or more mapped features, determining a frame level average distortion of each of the one or more geometric distortion parameters, determining a video level average distortion of each of the one or more geometric distortion parameters based on the frame level average distortion and correcting the one or more geometric distortions of the video content based on the video level average distortion of each of the one or more geometric distortion parameters. In case of correcting the one or more geometric distortions in the image, the computer readable storage medium which is not a signal stores computer executable instructions for identifying one or more features associated with an original image and a geometrically distorted image, mapping the one or more features of the original image and geometrically distorted image based on a predefined similarity threshold, determining one or more geometric distortion parameters from the one or more mapped features, determining an average distortion value of the one or more mapped features with respect to the one or more geometric distortion parameters and correcting the one or more geometric distortions based on the average distortion value of the one or more mapped features.

BRIEF DESCRIPTION OF THE DRAWINGS

Various embodiments of the invention will, hereinafter, be described in conjunction with the appended drawings. There is no intention to limit the scope of the invention to such blocks or objects, or to any particular technology. Instead these simplified diagrams are presented by way of illustration to aid in the understanding of the logical functionality of one or more aspects of the instant disclosure and is not presented by way of limitation.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present invention provide a system and method for correcting one or more geometric distortions. To correct the one or more geometric distortions in videos, the frames of the original and distorted video are mapped at the beginning and then the features associated with the mapped frames which are insensitive to geometric distortions are identified. In case of correcting geometric distortions in images, frame mapping is not required and thus the process starts from identifying the features insensitive to geometric distortions in the original image and distorted image. Then, the geometric distortion parameters are identified from the mapped features. After that, an average distortion of the mapped features in a frame is determined with respect to all the geometric distortion parameters. In case of video, an average distortion of all the frames is calculated based on the average distortion of the features in each frame to correct the geometric distortion.

Figure 1:
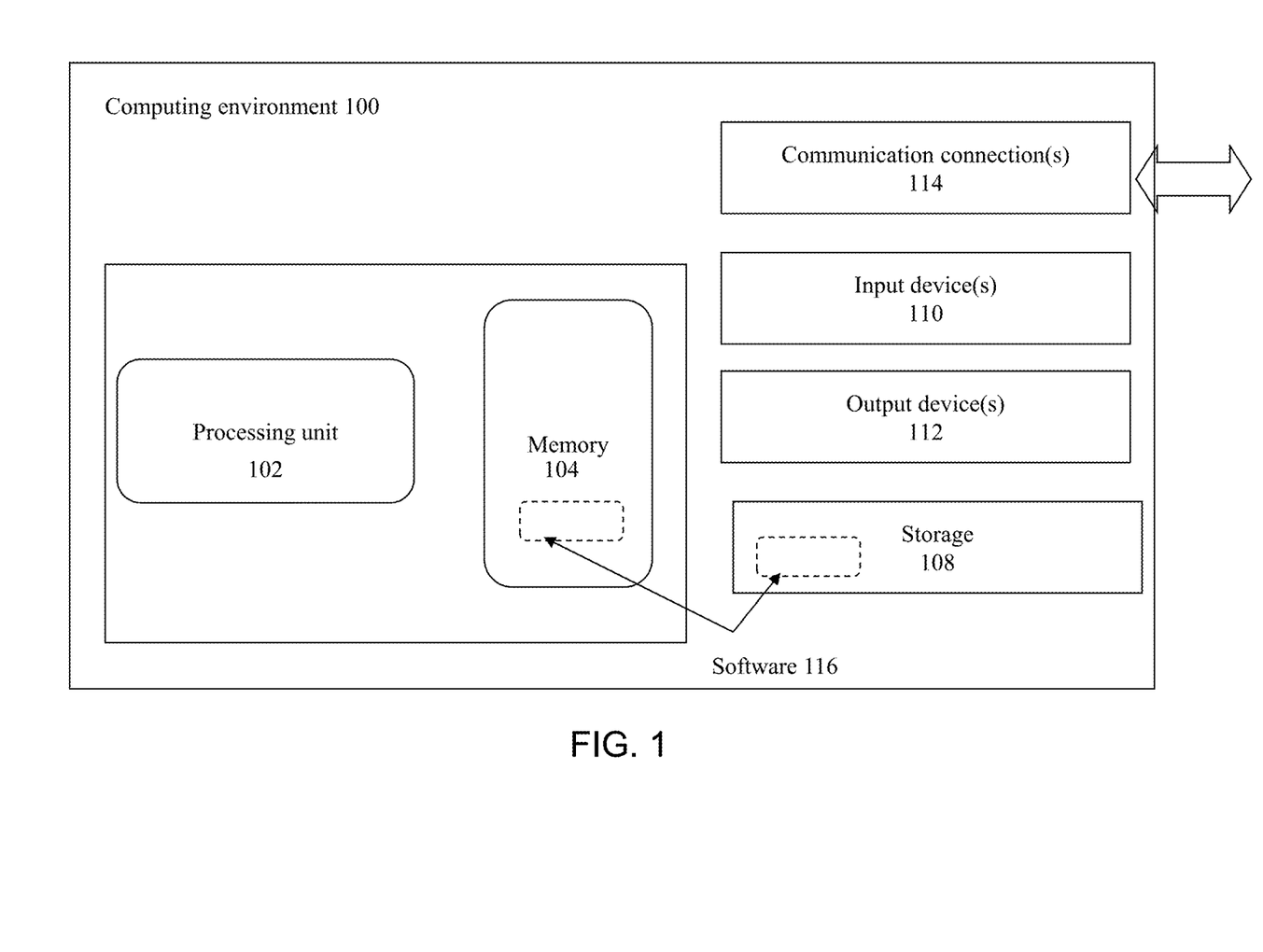
FIG. 1 is a computer architecture diagram illustrating a computing system capable of implementing the embodiments presented herein.

FIG. 1 illustrates a generalized example of a suitable computing environment 100 in which all embodiments, techniques, and technologies of this invention may be implemented. The computing environment 100 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like.

With reference to FIG. 1, the computing environment 100 includes at least one central processing unit 102 and memory 104. The central processing unit 102 executes computer-executable instructions. In a multi-processing system, multiple processing units execute computer-executable instructions to increase processing power and as such, multiple processors can be running simultaneously. The memory 104 may be volatile memory (e.g., registers, cache, RAM), non-volatile memory (e.g., ROM, EEPROM, flash memory, etc.), or some combination of the two. The memory 104 stores software 116 that can implement the technologies described herein. A computing environment may have additional features. For example, the computing environment 100 includes storage 108, one or more input devices 110, one or more output devices 112, and one or more communication connections 114. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

Figure 2:
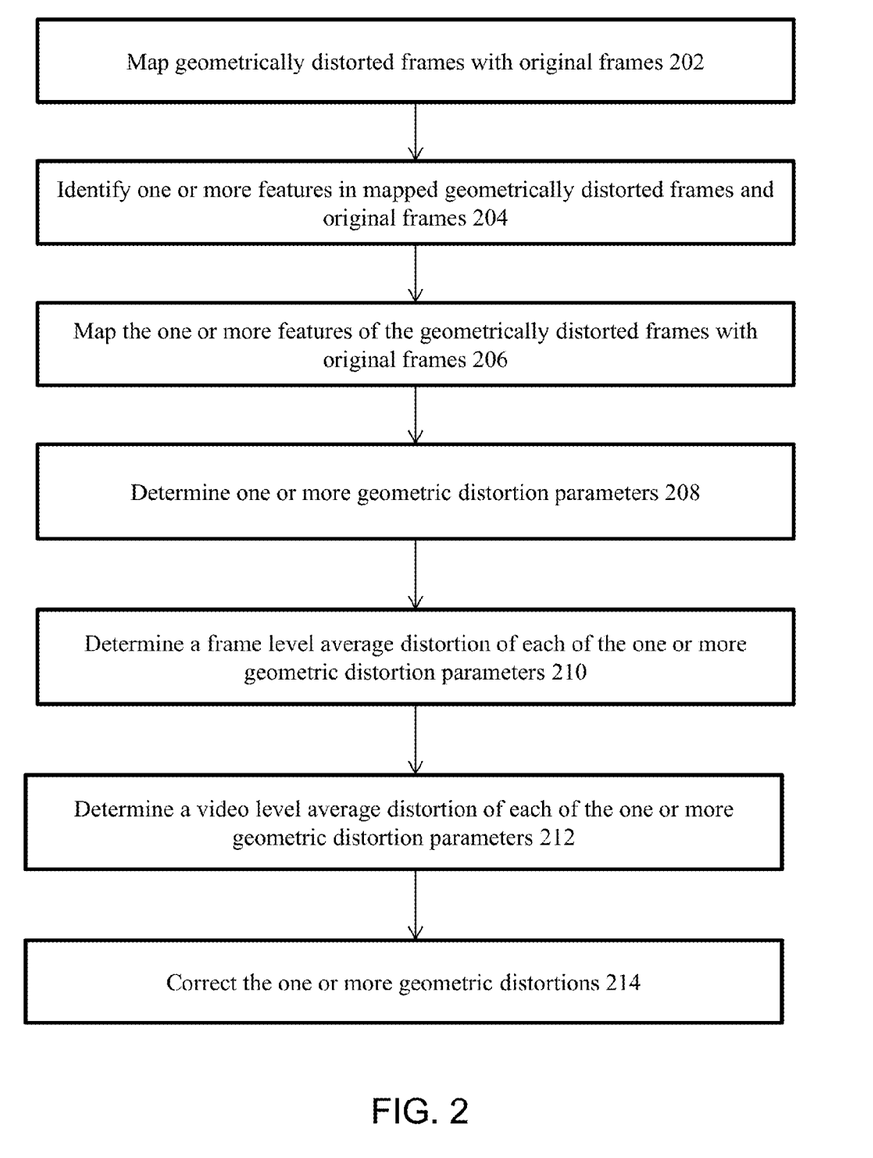
FIG. 2 is a flowchart, illustrating a method for correcting one or more geometric distortions in a video content, in accordance with an embodiment of the present invention.

FIG. 2 is a flowchart, illustrating a method for correcting one or more geometric distortions in a video content, in accordance with an embodiment of the present invention. Geometrically distorted frames are mapped with the original frames, as in step 202. The video consists of several frames and it is difficult to compare each frame of distorted video with each frame of original video manually. To address this problem, other well known properties of videos can be utilized. One of such property is a scene. Scene is a continuous sequence of frames which represents a continuous action captured by a camera. Any presently known scene detection algorithm can be used for detecting the scenes in the original and distorted video and one of such algorithms is mentioned in Indian Patent Application number 4233/CHE/2013. To map the original and geometrically distorted scenes, an average image per scene is calculated. The average image is the average of corresponding pixels of all the frames in the scene. The average images in the original and distorted videos can be represented as $$I_{avg}(j) = \frac{\sum_{i=1}^{p_j} F_i}{p_j}, \quad I'_{avg} = \frac{\sum_{i=1}^{p'_{j'}} F'_i}{p'_{j'}}$$

where $$I_{avg}$$

and $$I'_{avg}$$

represent the average image per scene in original and distorted videos respectively, S and S' represent the number of scenes in original and distorted videos, $p_j$ and $p'_{j'}$ represent the number of frames in $j^{th}$ scene of original video and $j^{th}$ scene of distorted videos respectively, $1 \leq j \leq S$ and $1 \leq j' \leq S'$.

Next, compute the singular values using Singular Value Decomposition (SVD) for each averaged image as follows:

$$\text{svd}(I_{avg}) = uwv^T,$$

$$\text{svd}(I'_{avg}) = u'w'v'^T$$

where u and $v^T$ are the orthonormal matrices of $I_{avg}$, u' and $v'^T$ are the orthonormal matrices of $I'_{avg}$, w and w' are the singular values of $I_{avg}$ and $I'_{avg}$ respectively.

Once the singular values of original and distorted scenes of a video are obtained, then the scenes can be mapped as follows:
if $\Sigma |w-w'| < T_1$ then
  Map the original and distorted scene.
else
  Discard the current original scene and check with other original average image ($I_{avg}$).
end if
where $T_1$ is the threshold used for scene mapping.

After scene mapping, the frames in distorted scene are determined which are either exact or close match of the frames in the corresponding original scene. Frames in the distorted scene can be mapped with the frames of original scene as:

```
for i_1 = 1 → p'_j do
    for i_2 = 1 → p_j do
        svd (F'(t_2)) = u'_f w'_f v'_f^T, svd(F(t_2)) = u_f w_f v_f^T
        if Σ | w'_f - w_f | < T_2 then
            Map original and distorted frame.
        else
            Continue with the remaining frames.
        end if
    end for
end for
``` where $T_2$ is the threshold for frame mapping.

Figure 3:
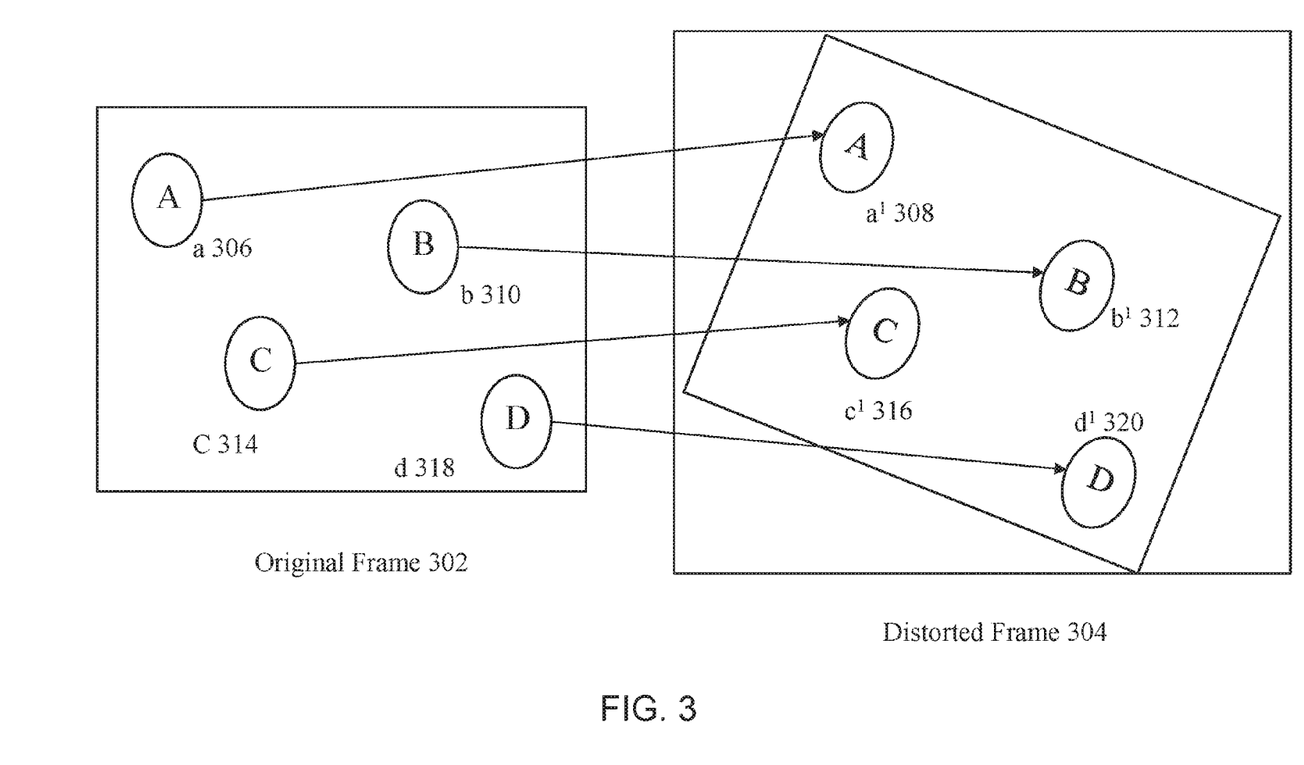
FIG. 3 depicts mapped features between the original frame and distorted frame, in accordance with an embodiment of the present invention.

Referring back to FIG. 2, one or more geometric distortion insensitive features associated with the mapped geometrically distorted frame and original frame are identified, as in step 204. Any known feature detection algorithm can be applied on both the original and distorted frame. Examples of feature detection algorithm may include Scale-Invariant Feature Transformation (SIFT) or Speeded Up Robust Features (SURF). The one or more identified features of the distorted frames and original frames are mapped, as in step 206. A feature in the distorted frame can be mapped to a feature in the original frame if the measure of similarity between their feature descriptor is less than a predefined threshold. FIG. 3 depicts mapped features between the original frame and distorted frame, in accordance with an embodiment of the present invention. In this figure, features a (306), b (310), c (314) and d (318) of original frame 302 are mapped with features a1 (308), b1 (312), c1 (316) and d1 (320) of distorted frame 304 respectively.

Figure 4:
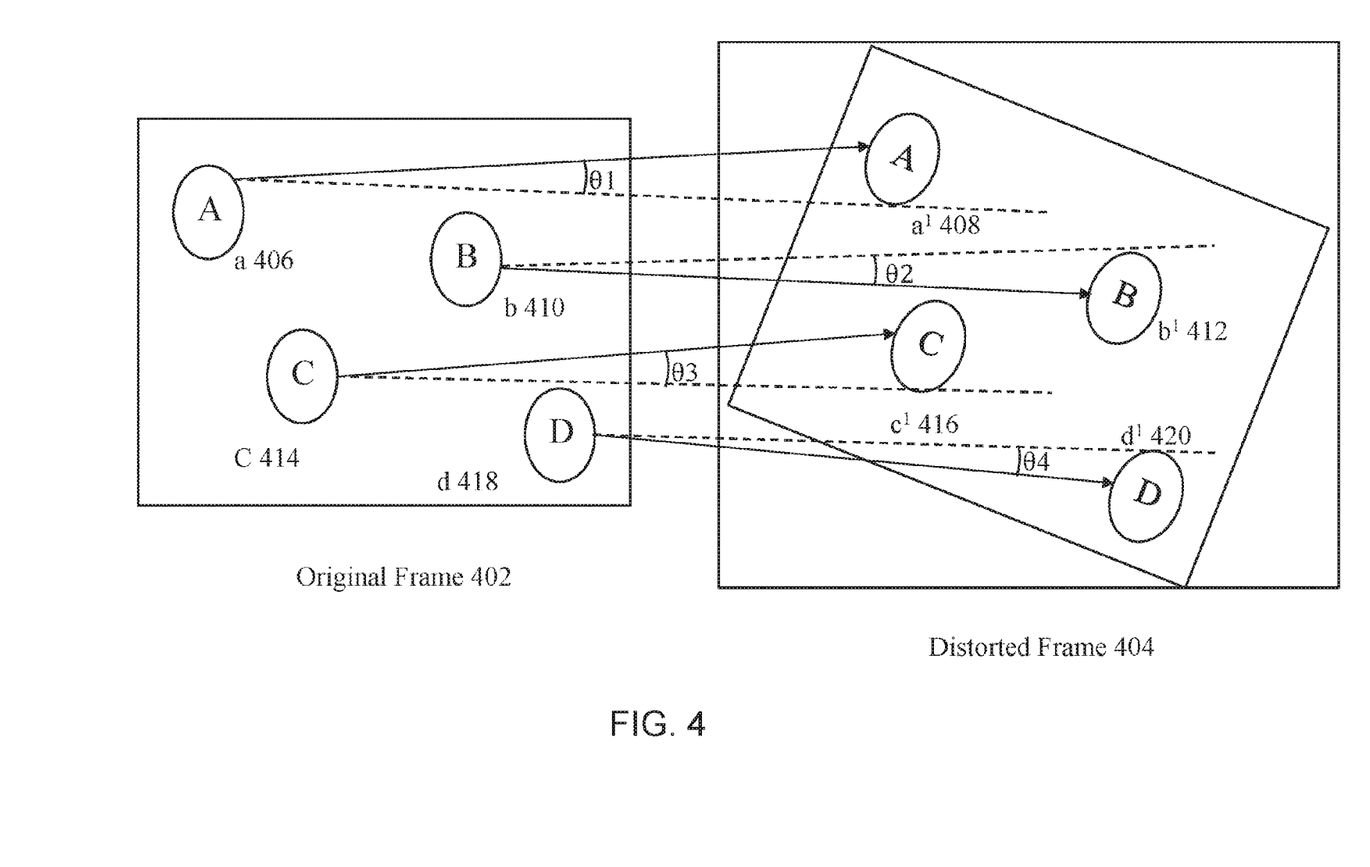
FIG. 4 depicts rotation angle between the corresponding features of the original frame and distorted frame, in accordance with an embodiment of the present invention.
Figure 5:
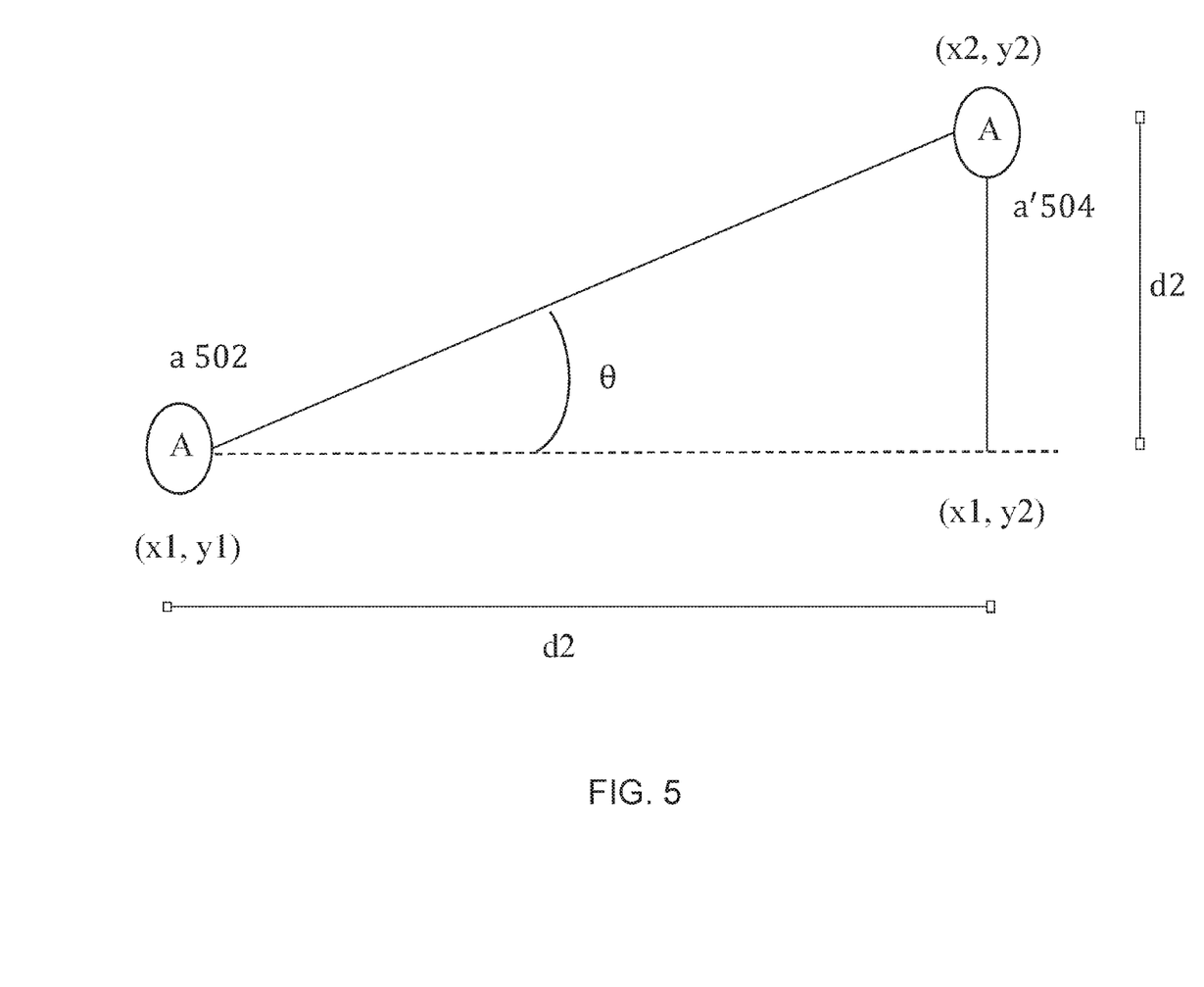
FIG. 5 illustrates computation of rotation angle between the corresponding feature of the original frame and distorted frame, in accordance with an embodiment of the present invention.

Referring back to FIG. 2, one or more geometric distortion parameters are determined from the mapped features. The geometric distortion parameters include rotation and scaling. FIG. 4 depicts rotation angle between the corresponding features of the original frame and distorted frame, in accordance with an embodiment of the present invention. As per the figure, rotation angle formed between feature a (306) and $a^1$ (308) is $\theta_1$. To find out the rotation angle ($\theta_1, \theta_2, \theta_3$ or $\theta_4$), the original and distorted frames are placed on the same plane such that the line joining their centers is parallel to the x-axis. Since the two frames are kept side by side, the angle will tend towards 0° with the increase in the distance between two frames. To avoid such situations, both the frames are kept at constant distance $d_c$ so that the error between the original angle and detected angle of rotation is close to zero. FIG. 5 illustrates computation of rotation angle between the corresponding feature of the original frame and distorted frame, in accordance with an embodiment of the present invention. To calculate the rotation angle, the distances between the corresponding mapped features (a 502 and $a^1$ 504) are calculated as follows:

$$d_1 = \sqrt[2]{(x_1-x_1)^2+(y_1-y_2)^2} = |y_1-y_2|$$

$$d_2 = \sqrt[2]{(y_1-y_2)^2+(x_1-x_2)^2} = |x_1-x_2|$$

After calculating the distances, the rotation angle between a (502) and $a^1$ (504) can be calculated as follows:

$$\theta = \tan^{-1}\frac{d_2}{d_1}$$

Content might be rotated either in clockwise direction or anticlockwise direction and hence, the polarity of the angle may change. For clockwise rotation, features in quadrant I and III will have $\theta \in \{0°,180°\}$ while features in quadrant II and IV will have $\theta \in \{180°,360°\}$. For anticlockwise rotation, features in quadrant II and IV will have $\theta \in \{0°,180°\}$ while features in quadrant I and III will have $\theta \in \{180°,360°\}$. If angle $\theta$ is greater than 180°, then it can be normalized as $$\theta = 360° - \theta.$$

Figure 6:
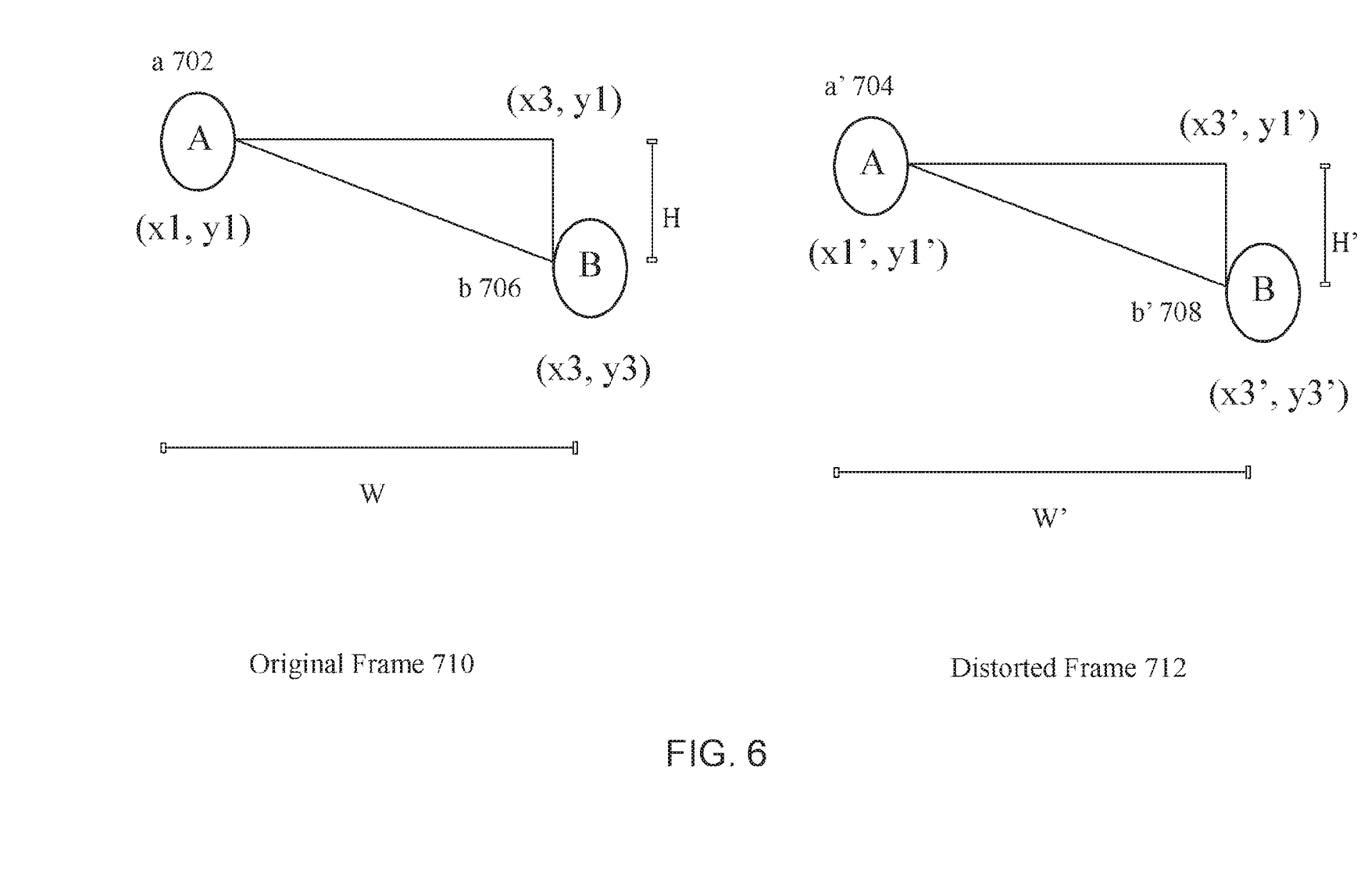
FIG. 6 depicts horizontal and vertical distances between features within a frame, in accordance with an embodiment of the present invention.

Although the original and distorted frames are in the same orientation i.e. there is no rotation between these frames, the size of these frames might not be same due to scaling. FIG. 6 depicts horizontal and vertical distances between features within a frame, in accordance with an embodiment of the present invention. These distances help in determining the change in width and height due to scaling and can be calculated as follows:

$$H = \sqrt[2]{(x_2-x_3)^2+(y_1-y_2)^2} = |y_1-y_3|$$

$$W = \sqrt[2]{(x_1-x_3)^2+(y_1-y_1)^2} = |x_1-x_3|$$

$$H' = \sqrt[2]{(x'_3-x'_3)^2+(y'_1-y'_2)^2} = |y'_1-y'_3|$$

$$W' = \sqrt[2]{(x'_1-x'_2)^2+(y'_1-y'_1)^2} = |x'_1-x'_3|$$

Each frame will be having many features and hence, we will be having as many geometric distortion parameters as the number of mapped features between the original and geometrically distorted mapped frame. Referring back to FIG. 2, a frame level average distortion of each of the one or more geometric distortion parameters is determined, as in step 210. This can be illustrated with reference to rotation and scaling as mentioned above. With reference to the rotation, if there are n features mapped between the original and distorted frame, then there will be n rotation angles. On rotation, all the features inside the original frame might not have rotated by same angle with which original frame was rotated. To select the angle by which the original frame has been rotated, the average or median of all the detected angles is computed as $$w_f = \text{average}(\theta(i)).$$

Similarly, in case of scaling, if there are n features mapped between original frame and distorted frame, then there will be (n−1) values of width and height for both original and distorted frames. To determine the final scaling parameters, the average or median of these (n−1) values of width and height for both original and distorted frames is computed as follows:

$$H_m = \text{average}(H);$$

$$H'_m = \text{average}(H');$$

$$\Delta h_f = H'_m / H_m$$

$$W_m = \text{average}(W);$$

$$W'_m = \text{average}(W');$$

$$\Delta w_f = W'_m / W_m$$

Videos consist of several frames. It might be possible that determined frame level average distortion of the parameters is different for different frames. If the mapped frames are corrected with these frame level average distortion, then it will result in a video which is of poor quality. For example, in case of rotation, it is possible that $w_f$ is not the same for all the frames and the video corrected using different $w_f$ values will yield poor viewing experience. To avoid this, video level average distortion of the geometric distortion parameters is computed, as shown in step 212 of FIG. 2. Video level average geometric distortion parameters are nothing but the average of the frame level geometric distortion parameters and are computed as:

$$w = \text{average}(w_f)$$

$$\Delta h = \text{average}(\Delta h_f) \text{ and } \Delta w = \text{average}(\Delta w_f)$$

Where w, $\Delta h$, and $\Delta w$ are the video level average rotational and scaling distortion parameters respectively.

The one or more geometric distortions are corrected based on the video level average distortion of each of the one or more geometric distortion parameters, as in step 214. In case of rotation, the distorted frames are rotated by −w to nullify the effect of rotation distortion. Though the orientation of the distorted frame is now same as that of the original frame but the distorted frame has accumulated additional area which needs to be cropped. For this, canny edge detector is applied on the distorted frame and distance of the outer edges is determined from all the sides. This distance is the additional area which is accumulated due to rotation. The proposed method crop this additional area.

Similarly for scaling, the height and width of the distorted frames are scaled by $1/\Delta w$ and $1/\Delta h$ times respectively using bilinear interpolation. The proposed method is not restricted to bilinear interpolation and any other scaling methods can be used. In various embodiments of the present disclosure the above mentioned technique is used to recover a watermark from a geometrically distorted video.

Figure 7:
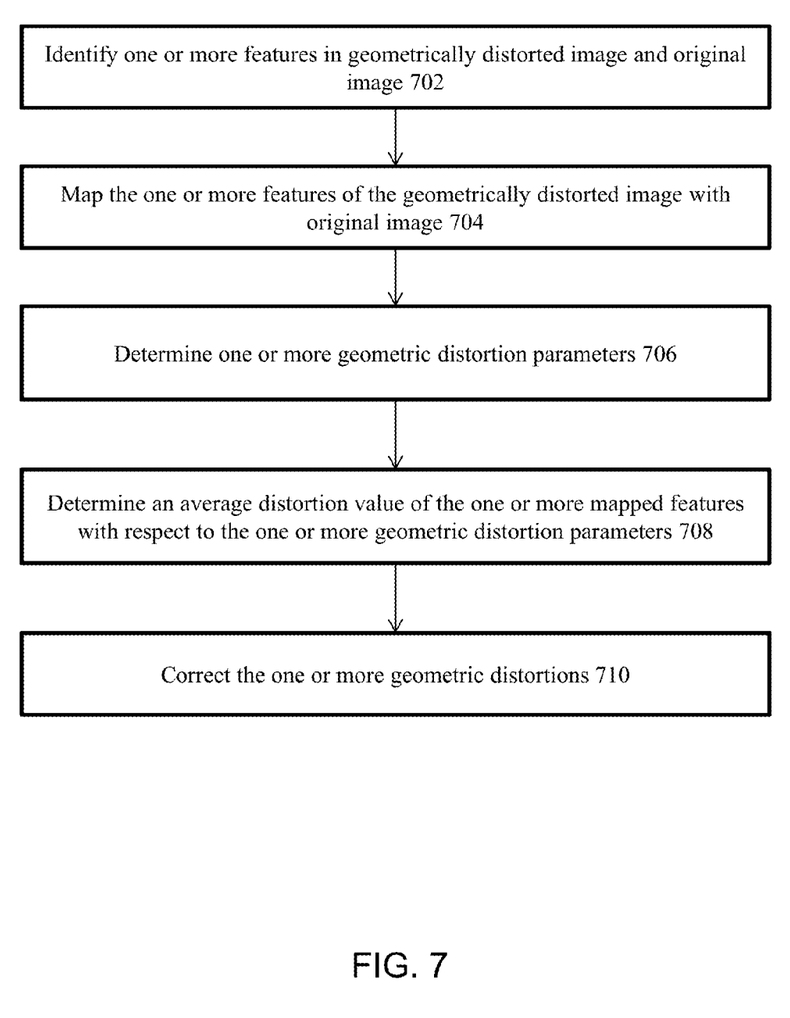
FIG. 7 is a flowchart, illustrating a method for correcting one or more geometric distortions in an image, in accordance with an embodiment of the present invention.

FIG. 7 is a flowchart, illustrating a method for correcting one or more geometric distortions in an image, in accordance with an embodiment of the present invention. One or more geometric distortion insensitive features are identified in the original and distorted images, as in step 702. Any known feature detection algorithm can be applied on both the original and distorted frame. Examples of feature detection algorithm may include Scale-Invariant Feature Transformation (SIFT) or Speeded Up Robust Features (SURF). The one or more features of the distorted and original image are mapped, as in step 704. A feature in the distorted frame can be mapped to a feature in the original frame if the measure of similarity between their feature descriptor is less than a predefined threshold. One or more geometric distortion parameters responsible for geometric distortions are determined from the mapped features, as in step 706. The geometric distortion parameters include rotation and scaling. The details regarding the rotation and scaling are described with reference to FIG. 4, FIG. 5 and FIG. 6. The average distortion of the one or more mapped features is determined with respect to the geometric rotation parameters, as in step 708. The step to calculate the average distortion of the one or more mapped features is described in detail hereinabove with reference to step 210 of FIG. 2. Finally, the one or more geometric distortions are corrected based on the average distortion of the features, as in step 710. In various embodiments of the present disclosure the above mentioned technique is used to recover a watermark from a geometrically distorted image.

Figure 8:
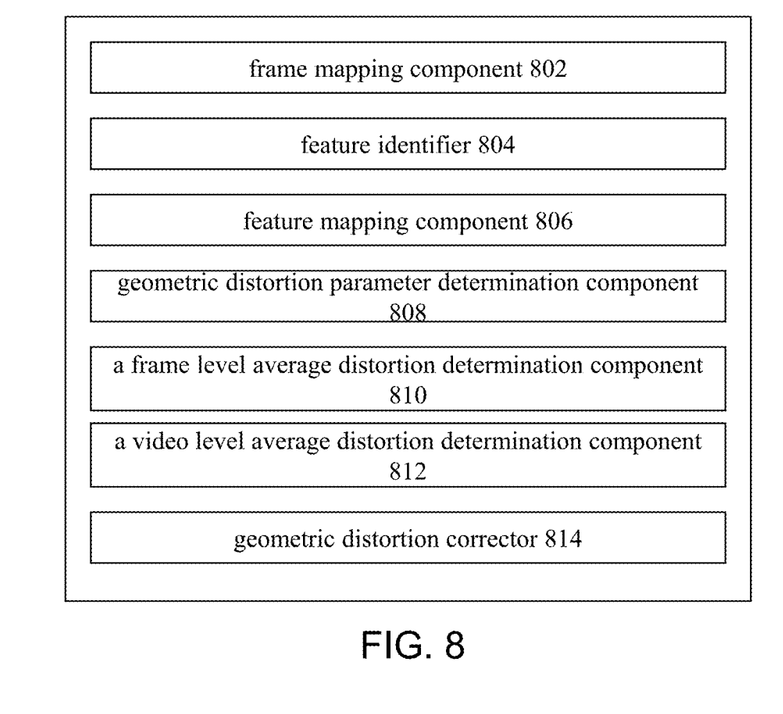
FIG. 8 is a block diagram illustrating a system for correcting one or more geometric distortions in a video content, in accordance with an embodiment of the present invention.

FIG. 8 is a block diagram illustrating a system for correcting one or more geometric distortions in a video content, in accordance with an embodiment of the present invention. The system includes a frame mapping component 802, a feature identifier 804, a feature mapping component 806, a geometric distortion parameter determination component 808, a frame level average distortion determination component 810, a video level average distortion determination component 812 and a geometric distortion corrector 814. The frame mapping component 802 is configured to map a plurality of geometrically distorted frames with a plurality of original frames of the video content. The details regarding the frame mapping is discussed herein above with reference to step 202 of FIG. 2. The feature identifier 804 is configured to identify one or more features associated with the plurality of mapped geometrically distorted frames and original frames, wherein the one or more features are insensitive to the one or more geometric distortions. Any known feature detection algorithm can be applied on both the original and distorted frame. Examples of feature detection algorithm may include Scale-Invariant Feature Transformation (SIFT) or Speeded Up Robust Features (SURF). The feature mapping component 806 is configured to map the one or more features of the plurality of mapped geometrically distorted frames with original frames based on a predefined similarity threshold. The geometric distortion parameter determination component 808 is configured to determine one or more geometric distortion parameters from the one or more mapped features. The geometric distortion parameters include rotation and scaling. The details regarding the rotation and scaling are described with reference to FIG. 4, FIG. 5 and FIG. 6. The frame level average distortion determination component 810 is configured to determine a frame level average distortion of each of the one or more geometric distortion parameters. The details regarding determining average distortion of each of the parameters are described with reference to step 210 of FIG. 2. The video level average distortion determination component 812 is configured to determine a video level average distortion of each of the one or more geometric distortion parameters based on the frame level average distortion. The process of determining video level average distortion is described in detail hereinabove with reference to step 212 of FIG. 2. The geometric distortion corrector 814 is configured to correct the one or more geometric distortions of the video content based on the video level average distortion of each of the one or more geometric distortion parameters. This has been described in detail herein above with reference to step 214 of FIG. 2. In various embodiments of the present disclosure, the system includes a watermark recovering component configured to recover a watermark from the geometrically distorted video content.

Figure 9:
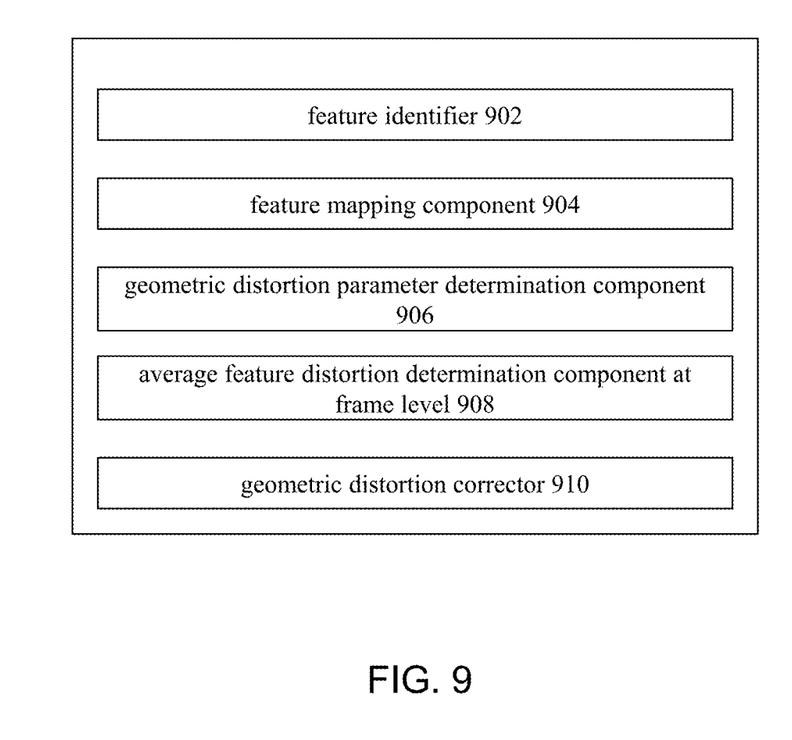
FIG. 9 is a block diagram illustrating a system for correcting one or more geometric distortions in an image, in accordance with an embodiment of the present invention.

FIG. 9 is a block diagram illustrating a system for correcting one or more geometric distortions in an image, in accordance with an embodiment of the present invention. The system includes a feature identifier 902, a feature mapping component 904, a geometric distortion parameter determination component 906, an average distortion value determination component 908 and a geometric distortion corrector 910. The feature identifier 902 is configured to identify one or more features inside an original image and a geometrically distorted image, wherein the one or more features are insensitive to the one or more geometric distortions. The feature mapping component 904 is configured to map the one or more features of the original image with the geometrically distorted image based on a predefined similarity threshold. The geometric distortion parameter determination component 906 is configured to determine one or more geometric distortion parameters from the one or more mapped features. The geometric distortion parameters include rotation and scaling. The details regarding the rotation and scaling are described with reference to FIG. 4, FIG. 5 and FIG. 6. The average distortion value determination component 908 is configured to determine an average distortion value of the one or more mapped features with respect to the one or more geometric distortion parameters. The process to calculate the average distortion of the one or more mapped features is described in detail hereinabove with reference to step 210 of FIG. 2. The geometric distortion corrector 910 is configured to correct the one or more geometric distortions based on the average distortion value of the one or more mapped features.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

The invention claimed is:

1. A computer implemented method for correcting one or more geometric distortions in a video content comprising:
    mapping, by a computing device, a plurality of geometrically distorted frames with a plurality of original frames of the video content;
    identifying, by the computing device, one or more features associated with the plurality of mapped geometrically distorted frames and original frames, wherein the one or more features are insensitive to the one or more geometric distortions;
    mapping, by the computing device, the one or more features of the plurality of mapped geometrically distorted frames with original frames based on a predefined similarity threshold;
    determining, by the computing device, one or more geometric distortion parameters from the one or more mapped features;
    determining, by the computing device, a frame level average distortion of each of the one or more geometric distortion parameters;
    determining, by the computing device, a video level average distortion of each of the one or more geometric distortion parameters based on the frame level average distortion; and
    correcting, by the computing device, the one or more geometric distortions of the video content based on the video level average distortion of each of the one or more geometric distortion parameters.

2. The method of claim 1 further comprises recovering a watermark from the geometrically distorted video content.

3. The method of claim 1, wherein the plurality of geometrically distorted frames are mapped with the plurality of original frames based on one or more previously mapped distorted scenes and original scenes.

4. The method of claim 1, wherein the plurality of geometrically distorted frames are mapped with the plurality of original frames by computing singular values for the plurality of distorted frames and the plurality of original frames.

5. The method of claim 1, wherein the one or more geometric distortion parameters comprise rotation or scaling or combination thereof.

6. The method of claim 5, wherein the rotation is determined by computing rotation angle between the one or more mapped features of the plurality of geometrically distorted frames and original frames.

7. The method of claim 5, wherein the scaling is determined by computing horizontal and vertical distances between the one or more features within the plurality of geometrically distorted frames and original frames.

8. A computer implemented method for correcting one or more geometric distortions in an image comprising:
- identifying, by a computing device, one or more features associated with an original image and a geometrically distorted image, wherein the one or more features are insensitive to the one or more geometric distortions;
- mapping, by the computing device, the one or more features of the original image and geometrically distorted image based on a predefined similarity threshold;
- determining, by the computing device, one or more geometric distortion parameters from the one or more mapped features;
- determining, by the computing device, an average distortion value of the one or more mapped features with respect to the one or more geometric distortion parameters; and
- correcting, by the computing device, the one or more geometric distortions based on the average distortion value of the one or more mapped features.

9. A system for correcting one or more geometric distortions in a video content comprising:
- a processor in operable communication with a processor readable storage medium, the processor readable storage medium containing one or more programming instructions whereby the processor is configured to implement:
  - a frame mapping component configured to map a plurality of geometrically distorted frames with a plurality of original frames of the video content;
  - a feature identifier configured to identify one or more features associated with the plurality of mapped geometrically distorted frames and original frames, wherein the one or more features are insensitive to the one or more geometric distortions;
  - a feature mapping component configured to map the one or more features of the plurality of mapped geometrically distorted frames with original frames based on a predefined similarity threshold;
  - a geometric distortion parameter determination component configured to determine one or more geometric distortion parameters from the one or more mapped features;
  - a frame level average distortion determination component configured to determine a frame level average distortion of each of the one or more geometric distortion parameters;
  - a video level average distortion determination component configured to determine a video level average distortion of each of the one or more geometric distortion parameters based on the frame level average distortion; and
  - a geometric distortion corrector configured to correct the one or more geometric distortions of the video content based on the video level average distortion of each of the one or more geometric distortion parameters.

10. The system of claim 9 further comprises a watermark recovering component configured to recover a watermark from the geometrically distorted video content.

11. The system of claim 9, wherein the plurality of geometrically distorted frames are mapped with the plurality of original frames based on one or more previously mapped distorted scenes and original scenes.

12. The system of claim 9, wherein the plurality of distorted frames are mapped with the plurality of original frames by computing singular values for the plurality of geometrically distorted frames and the plurality of original frames.

13. The system of claim 9, wherein the one or more geometric distortion parameters comprise rotation or scaling or combination thereof.

14. The system of claim 13, wherein the rotation is determined by computing rotation angle between the one or more mapped features of the plurality of geometrically distorted frames and original frames.

15. The system of claim 14, wherein the scaling is determined by computing horizontal and vertical distances between the one or more features within the plurality of geometrically distorted frames and original frames.

16. A system for correcting one or more geometric distortions in an image comprising:
- a processor in operable communication with a processor readable storage medium, the processor readable storage medium containing one or more programming instructions whereby the processor is configured to implement:
  - a feature identifier configured to identify one or more features inside an original image and a geometrically distorted image, wherein the one or more features are insensitive to the one or more geometric distortions;
  - a feature mapping component configured to map the one or more features of the original image with the geometrically distorted image based on a predefined similarity threshold;
  - a geometric distortion parameter determination component configured to determine one or more geometric distortion parameters from the one or more mapped features;
  - an average distortion value determination component configured to determine an average distortion value of the one or more mapped features with respect to the one or more geometric distortion parameters; and
  - a geometric distortion corrector configured to correct the one or more geometric distortions based on the average distortion value of the one or more mapped features.

17. A non-transitory computer readable medium having stored thereon instructions for correcting one or more geometric distortions in a video content, comprising machine executable code which when executed by at least one processor, causes the at least one processor to perform steps comprising:
- mapping a plurality of geometrically distorted frames with a plurality of original frames of the video content;

identifying one or more features associated with the plurality of mapped geometrically distorted frames and original frames, wherein the one or more features are insensitive to the one or more geometric distortions;

mapping the one or more features of the plurality of mapped geometrically distorted frames with original frames based on a predefined similarity threshold;

determining one or more geometric distortion parameters from the one or more mapped features;

determining a frame level average distortion of each of the one or more geometric distortion parameters;

determining a video level average distortion of each of the one or more geometric distortion parameters based on the frame level average distortion; and correcting the one or more geometric distortions of the video content based on the video level average distortion of each of the one or more geometric distortion parameters.

18. A non-transitory computer readable medium having stored thereon instructions for correcting one or more geometric distortions in an image, comprising machine executable code which when executed by at least one processor, causes the at least one processor to perform steps comprising:

identifying one or more features associated with an original image and a geometrically distorted image, wherein the one or more features are insensitive to the one or more geometric distortions;

mapping the one or more features of the original image and geometrically distorted image based on a predefined similarity threshold;

determining one or more geometric distortion parameters from the one or more mapped features;

determining an average distortion value of the one or more mapped features with respect to the one or more geometric distortion parameters; and correcting the one or more geometric distortions based on the average distortion value of the one or more mapped features.

* * * * *